United States Patent [19]

Durrant

[11] 4,280,243

[45] Jul. 28, 1981

[54] BULK LOADING FACILITY HAVING A DROP WAY

[76] Inventor: Richard Durrant, 1124 Cambridge Crescent, Sarnia, Ontario, Canada, N75 3Z9

[21] Appl. No.: 64,030

[22] Filed: Aug. 6, 1979

[51] Int. Cl.³ .............................................. E01D 1/00
[52] U.S. Cl. ...................................... 14/71.1; 182/82
[58] Field of Search .................... 404/1; 14/69.5, 71.1, 14/71.3; 182/82, 1

[56] References Cited

U.S. PATENT DOCUMENTS

| | | | |
|---|---|---|---|
| 1,590,317 | 6/1926 | Richards | 182/1 X |
| 1,674,279 | 6/1928 | Ebeling | 14/69.5 |
| 2,777,737 | 1/1957 | Balogh | 182/1 |
| 2,815,872 | 12/1957 | Graham | 14/69.5 X |
| 3,023,831 | 3/1962 | Bevis | 182/82 |
| 3,082,843 | 3/1963 | Leonard | 182/82 |
| 3,095,848 | 7/1963 | Dick | 14/71.1 X |
| 3,341,874 | 9/1967 | Jarvis | 14/71.1 |
| 3,595,510 | 7/1971 | Hutchinson | 182/82 X |
| 4,168,764 | 9/1979 | Walters | 182/1 |
| 4,171,550 | 10/1979 | Phaup | 14/71.1 |

*Primary Examiner*—Nile C. Byers, Jr.
*Attorney, Agent, or Firm*—William L. Fisher

[57] ABSTRACT

Improvement in a bulk loading facility having a fixed deck having a vertical column as a part thereof and a drop way hinged to the deck so that it can be raised or lowered for loading, the improvement comprising the drop way having a handrail assembly including a handrail and a post for the handrail, the handrail and the post hinged to each other, the post hinged to the drop way, the handrail hinged to the column, and a four-bar mechanism consisting of the drop way, the handrail, the post and a portion of the column between the handrail and the drop way, the four-bar mechanism constructed so that the sum of the lengths of the column portion and the top rail is greater than the sum of the lengths of the drop way and the post, whereby the drop way has an overcenter action during raising thereof which assists in maintaining the drop way in its raised position.

26 Claims, 14 Drawing Figures

BULK LOADING FACILITY HAVING A DROP WAY

My invention relates to bulk loading facilities.

The principal object of my invention is to provide improvements in bulk loading facilities using drop ways, commonly known as gangways and drop platforms.

The foregoing object of my invention and the advantages thereof will become apparent during the course of the following description, taken in conjunction with the accompanying drawings, in which.

Figure 1:
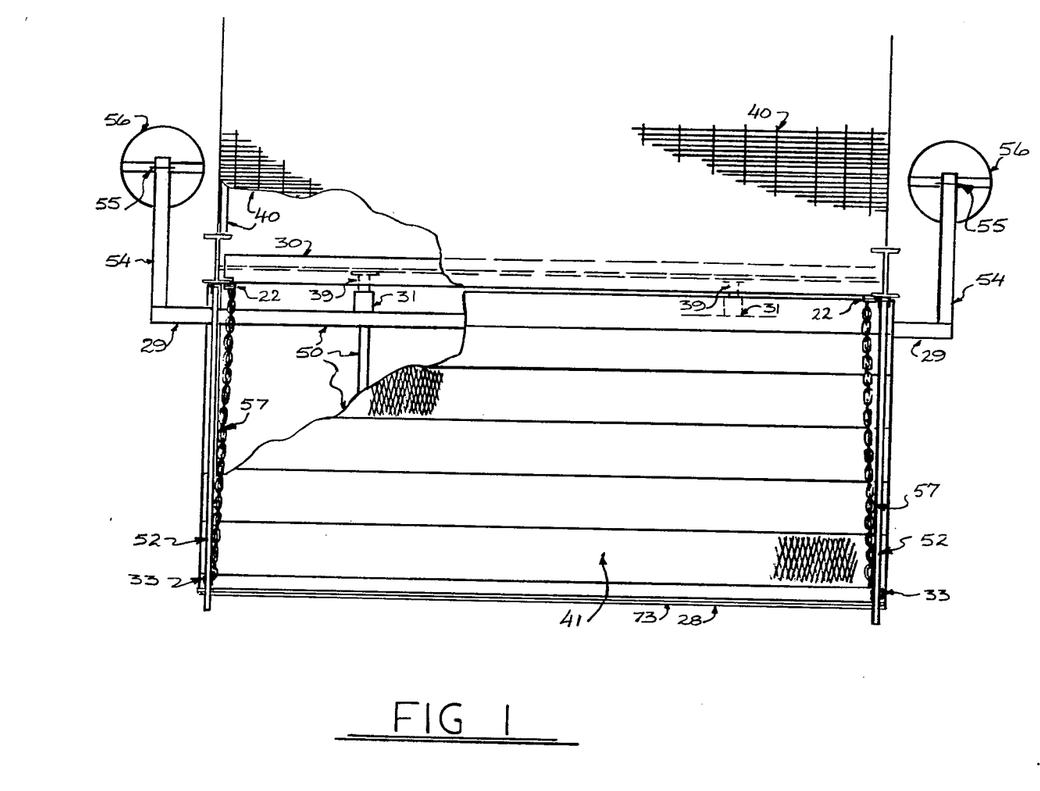
FIGS. 1–3 are, respectively, fragmentary top plan, front and side elevational view of an improved bulk loading facility embodying my invention using a drop platform.
Figure 2:
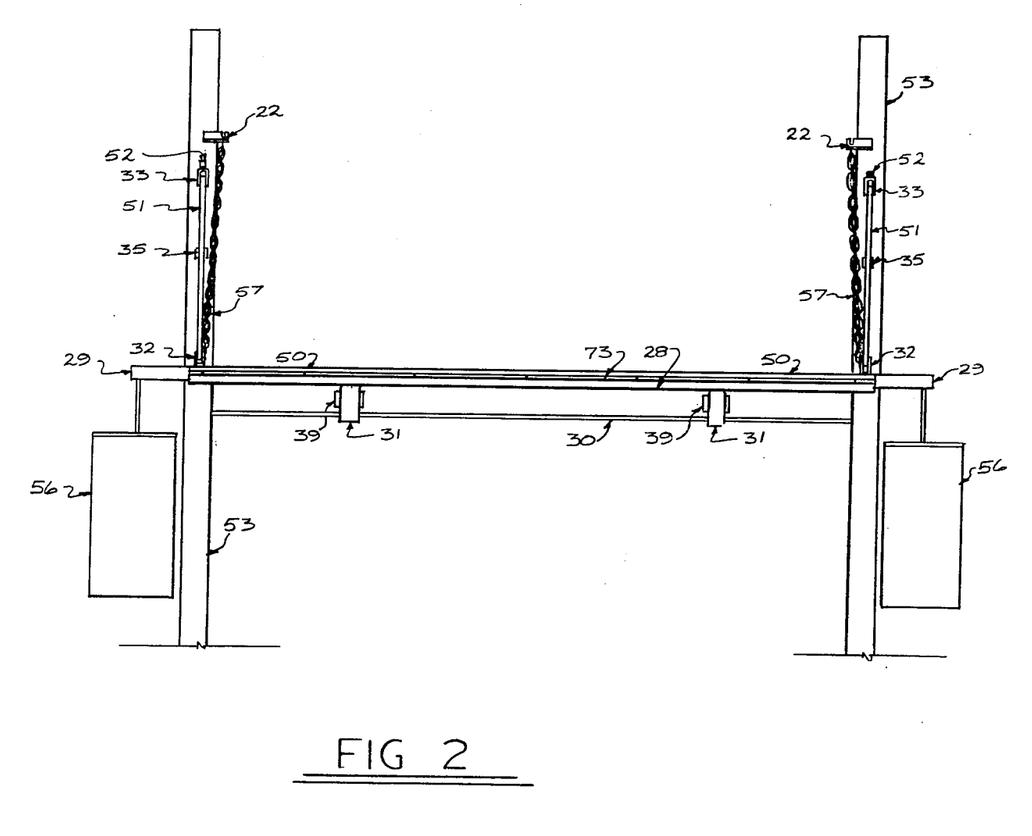
Figure 3:
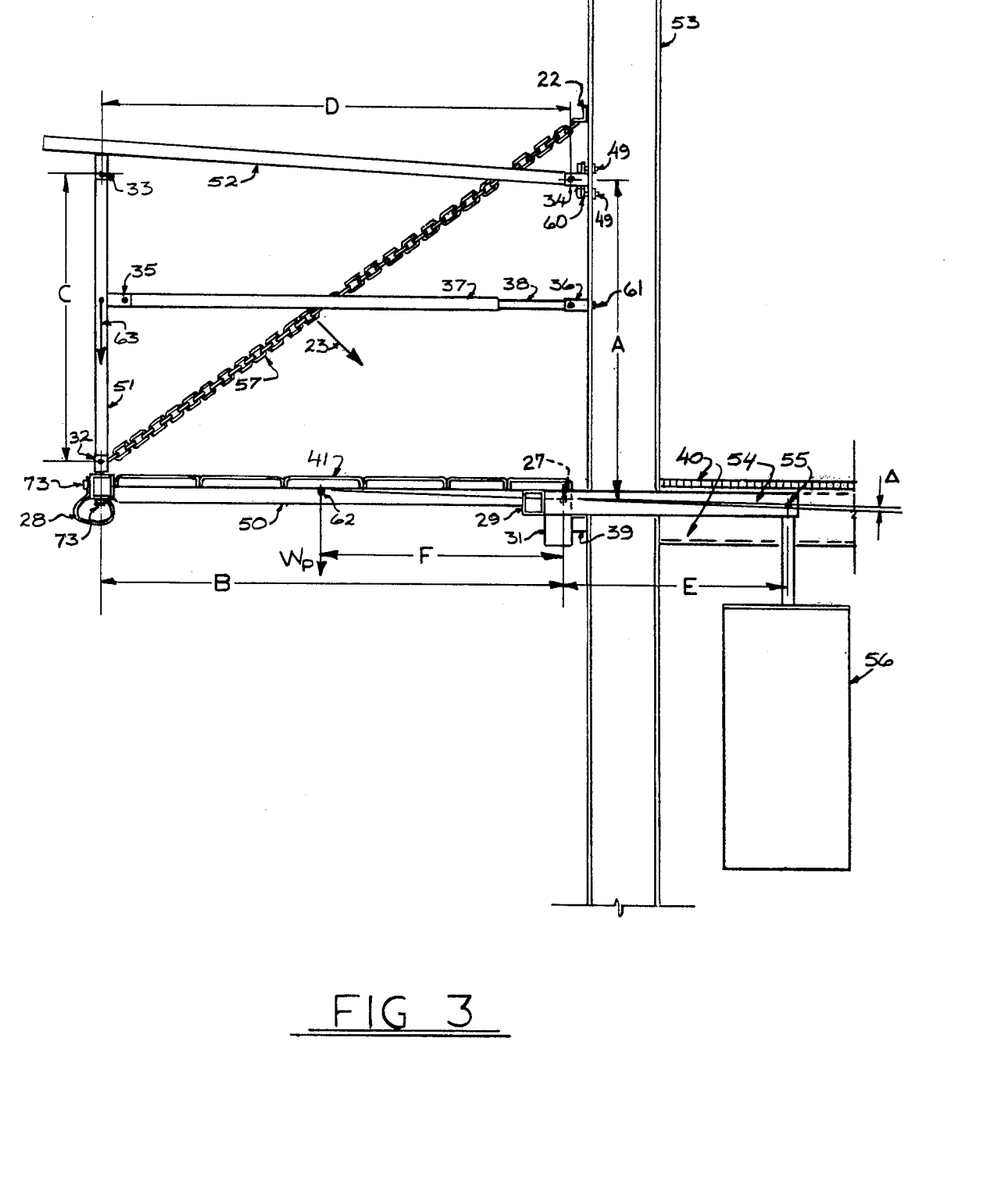
Figure 4:
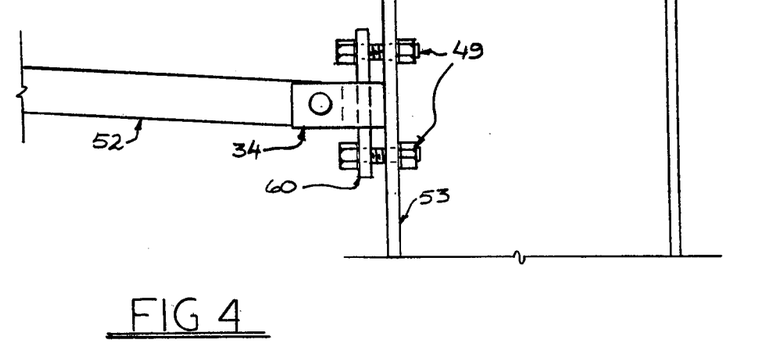
FIGS. 4–6 are enlarged views of a portion of the structure of FIG. 3.
Figure 5:
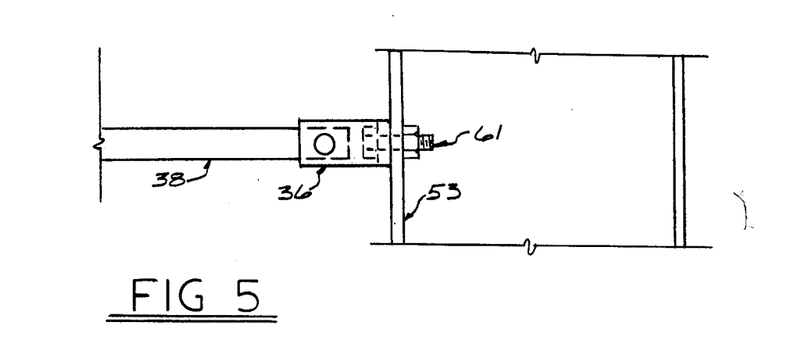
Figure 6:
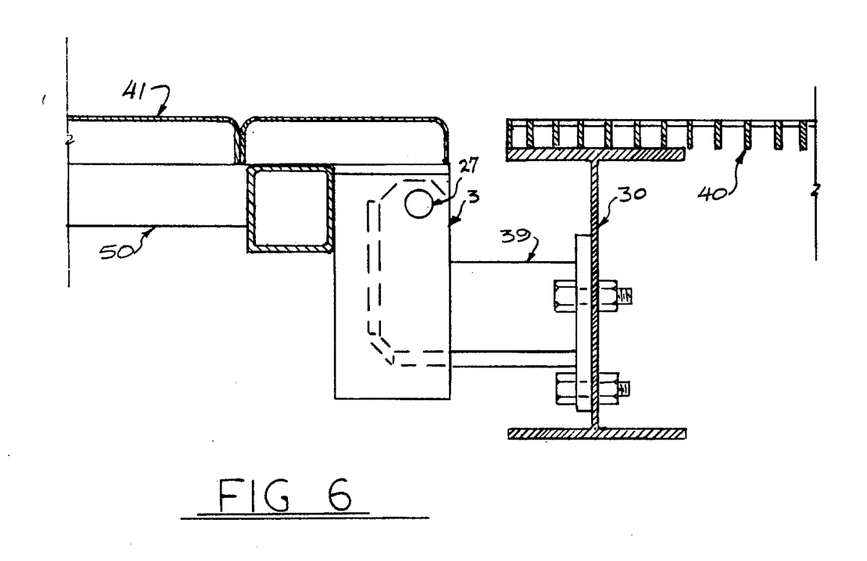
Figure 7:
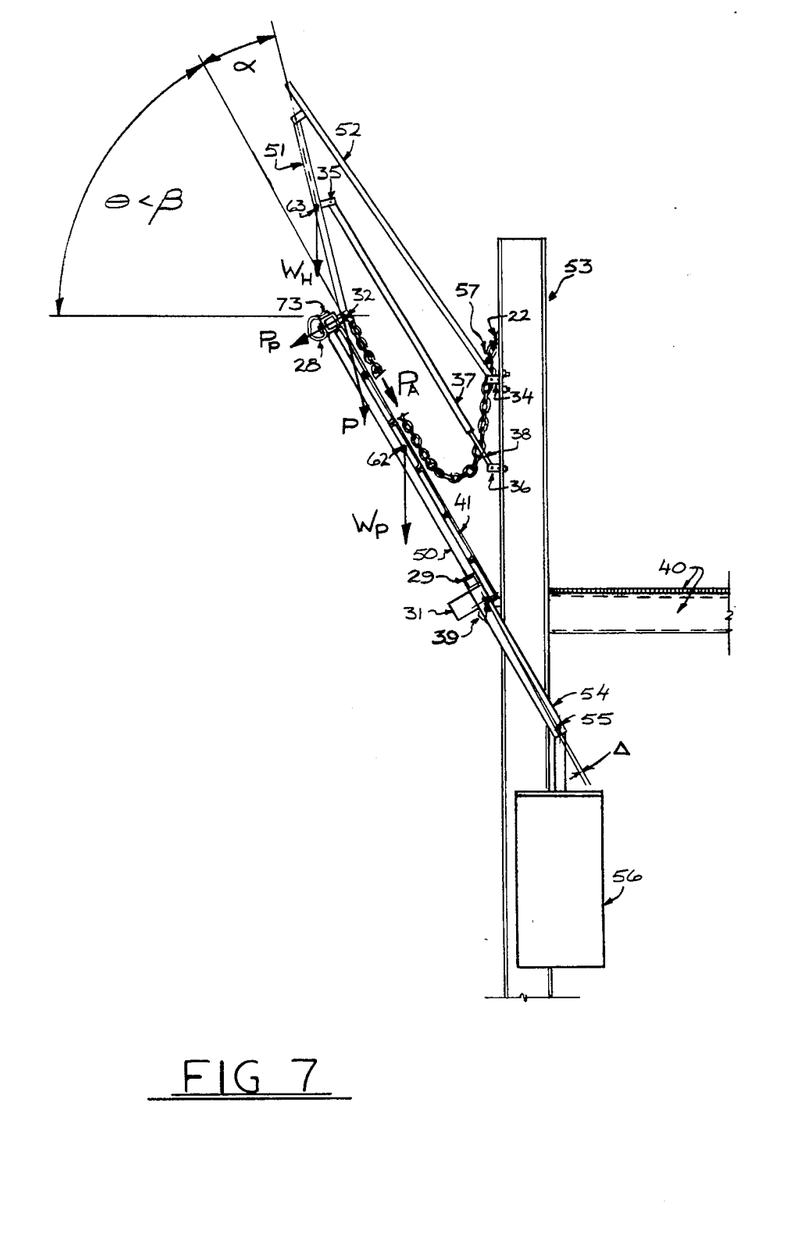
FIGS. 7 and 8 are respective side elevational views of said drop platform shown in different operational views thereof.

Referring to the drawings in greater detail and first to FIGS. 1–8, a drop platform is illustrated therein which is hinged to a fixed platform 40. The fixed platform 40 includes columns 53, beam 30, and suitable decking and a pair of hinge elements 39. The drop platform is made up of a main frame 50 having a decking 41 thereon and a pair of hinge elements 31 and a handrail assembly consisting of a pair of vertical posts 51, a pair of handrails 52, and a pair of telescoping middle rails 37, 38. The handrails 52 are pivotally connected to the posts 52 by hinges 33 and the middle rails 37 are also pivotally connected to the posts 52 by hinges 35. The hinge elements 31 and 39 are joined together by a hinge pin 27 which is preferably provided with a grease fitting. Associated with said drop platform is a counterbalance assembly consisting of a pair of counterweights 56, structural members 29, 54 therefor and pivot pins 55 connecting the counterbalance weights 56 to to said members 54. Attached to the front edge of the main frame 50 is a rubber bumper 28 held in place by retention bars 73. Said structural member 29 extends widthwise of said main frame 50 near the rear edge thereof and is joined to said structural members 54 to support the outboard counterbalance weights 56. The main hinge assembly 27, 31, 39 connects the drop platform main frame 50 to the fixed platform beam 30. The hinges 27, 31, 39 are preferably located near the side edges of the drop platform as shown. The decking 41 has a non-slip surface and a load bearing capacity of not less than 100 pounds per square foot for a uniformly distributed load. The decking is securely anchored to the main frame 50 by suitable fasteners (not shown). Said handrail assembly is connected to the drop platform main frame 50 and to the fixed platform column 53 by hinges 32, 34, and 36. Each hinge 36 is bolted to the column 53, as at 61, and each hinge 34 is adjustable vertically of the column 53, as by the clamp mechanism 49, 60. A four-bar mechanism is provided by the drop platform and handrail assembly consisting of a pair on each side of the drop platform. Each pair consists of column 53 (including hinge element 39 and hinge 34), main frame 50 (including hinge components 27, 31, and hinge 32), handrail post 51, and top rail 52 (including hinge 33). All components of the four-bar linkage are restrained to move in a vertical plane and the action is therefore not influenced by the widthwise location of hinge 27, 31, 39 along the mainframe 50. Since the middle rail members 37, 38 telescope they are not a part of said four-bar mechanism. Chains 57 are welded to hinges 32 on the drop platform main frame 50 and are removably attached to a pair of brackets 22 made fast to the fixed platform column 53. Each chain 57 is sufficiently long to permit full travel of the drop platform to a horizontal position. Each bracket 22 is provided with a slot to engage its respective chain 57 at any point along its length to keep the chain 57 taut. In the handrail assembly, the hinge 33 is set below the top rail 52 to ensure finger clearance for any workman holding said top rail 52; also, the length of the latter is made longer by virtue of said hinge 33 which is good for said four-bar mechanism as will be explained. All hinges (27, 31, 39); 32; 34; 35; 38; and 55 are conventional pin-in-sleeve type acting in double shear for strength, rigidity, increased lubricant life and decreased maintenance. In FIG. 3 the designation "A" is the distance between hinges 27 and 34; the designation "B" the distance between hinges 27 and 32; "C" the distance between hinges 32 and 33; "D" the distance between hinges 33 and 34; "E" the distance between hinges 27 and 55; and "F" the distance between hinge 27 and the center of gravity 62 of the drop platform 41; the handrail assembly has an effective center of gravity, as will be explained hereinafter, which is indicated at 63.

Figure 8:
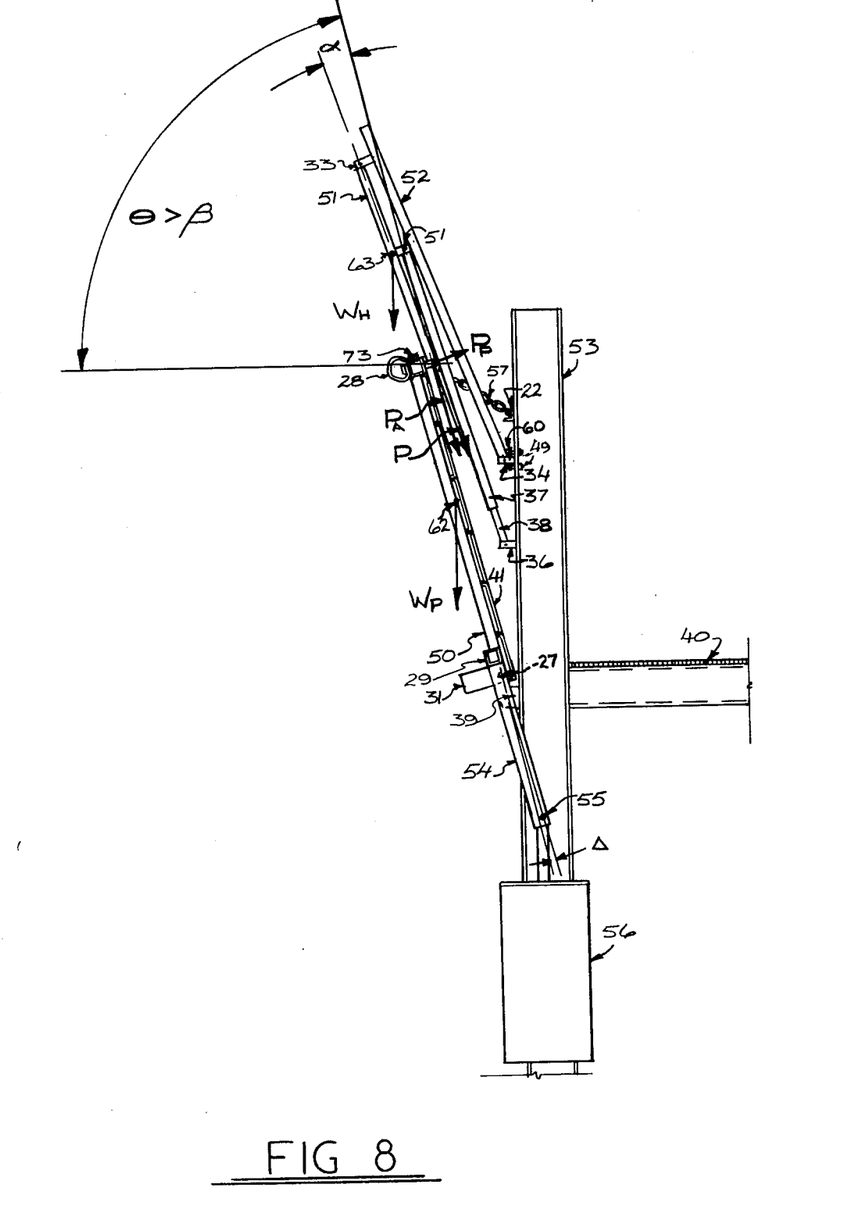

In operation, said drop platform acts as a hinged extension to the fixed platform which when lowered to the horizontal or near horiztonal plane, provides access for workmen to the top or side of a vehicle or portable container for loading; whenever the term loading is used herein it should be understood that it includes unloading. The drop platform can be raised away from the vehicle or vessel to permit movement of the vehicle or vessel. The drop platform is stored in its raised position and is preferably restrained in this position by drawing the chain 57 taut and latching it via the slot provided in bracket 22. To lower the platform, the chain 57 is unlatched and the workman applies a force horizontally to the main frame 50 with his foot or hand. The workman regulates the rate of descent by pulling on or releasing chain 57. The counterbalance weight 56 is adjusted at time of assembly to have less weight than that required to achieve perfect balance with the handrail assembly; once in the lowered position, the drop platform remains there. The unbalanced moment is proportional to the uncompensated weight of the drop platform when in the horizontal position. The front edge of the main frame 50 normally bears on the vessel or container through the rubber bumper 28. If not, the chains 57 should be pulled taut and latched at bracket 22 to hold said front edge at the desired level. In order to raise the platform a force is applied to one of the chains 57 by a workman standing on the fixed platform deck 40 and manually pushing upon the chain 57 in the direction of the arrow 23; for this purpose the chains 57 should first be made taut. In this raising operation, there is a mechanical advantage provided by column 53 (including hinge element 39 and latch 22), main frame 50 (including hinge components 27, 31 and hinge 32) and the two chain segments of chain 57 above and below the point of application of the raising force at arrow 23. This mechanical advantage greatly reduces the required effort on the part of the workman to raise the drop platform. In order to raise the drop platform the workman must provide a force to overcome the inertia of the drop platform and a force to overcome the net unbalanced moment Mu of the center of gravity of the drop platform over the weight of the counterweight 56. As a consequence, larger drop platforms, i.e. wider and/or longer, can be manually raised and larger values of the net unbalanced moment Mu can be designed into the system which means that higher hold down forces can be achieved. In practical application this is a safety factor because it means increased stability in lowering in that the drop platform will not rebound off the vehicle to be loaded against the workman or even off the chains 57 against the workman. In raising the drop platform the workman initiates the raising of the drop platform as explained and after it starts upwardly he need only pull horizontally on the chain 57 to assist the upward movement of the drop platform. At some point in this raising operation, the unbalanced moment Mu changes direction (i.e. changes from a hold down moment to a hold up moment) and the platform continues to the raised position without further manual assistance. The drop platform is stable in its raised position due to the influence of an over-center action of said four-bar mechanism and/or an eccentric angle $\Delta$ as will be explained hereinafter. Upon raising of the drop platform, it is usual for safety purposes for the workman to unlatch chain 57 from bracket 22, draw the chain 57 taut and re-latch the same to bracket 22. The change in direction of the unbalanced moment mentioned above is due to the combined influence of the relative masses and locations of the centers of gravity of the drop platform, handrail assembly, and counterbalance weights. The drop platform center of gravity 62 imparts a positive moment (counterclockwise in FIGS. 7 and 8) about the hinge point 27 which varies with the sine of the angle of inclination $\theta$ of the drop platform. The counterbalance weight 56 acts vertically through the hinge point 55 and imparts a negative moment (clockwise) about hinge point 27 which varies with the sine of (angle $\theta$ minus angle $\Delta$). Angle $\Delta$ is the angle between two lines: (a) the line joining pin 27 and pin 55 and (b) the line passing through the drop platform center of gravity 62 and the pin 27; the angle between these lines is commonly referred to as the eccentricity of the counterweight and can be varied as much as about five degrees. Because of this eccentric angle the counterweight system, though it is about 5% lighter than the drop platform in the down position, can realize a 15% to 20% advantage in the hold up force exerted on the drop platform; this can be both demonstrated mathematically and achieved in actual practice. A portion of the weight of the handrail assembly 51, 52, 37, 38 acts on the drop platform main frame assembly 50 through member 51 and hinges 32 and has an effective center of gravity 63. The balance of the weight of the handrail assembly acts on column 53 of the fixed platform through hinges 34 and 36. The handrail assembly imposes a moment about hinge 27 which varies both with the angle of inclination of the platform $\theta$ and an angle $\alpha$ between the center line of member 51 and the center line of the drop platform. The weight of the handrail assembly, designated $W_H$, imposes at hinge 32, a force P which has a component $P_A$ along the axis of the drop platform and a component $P_P$ perpendicular to the axis of the drop platform. The first component $P_A$ has no resultant moment about hinge 27; the second component $P_P$ results in a moment $M_H$ about hinge 27 due to the handrail assembly. Angle $\alpha$ varies as a function of angle $\theta$ and with the lengths of the members of the four-bar mechanism 50, 51, 52, 53. As long as angle $\theta$ is less than a predetermined angle (designated $\beta$ in FIGS. 7 and 8) angle $\alpha$ remains positive; this condition obtains in FIG. 7. The angle $\alpha$ will be equal to zero when $\theta$ is equal to angle $\beta$. As angle $\theta$ increases past angle $\beta$, angle $\alpha$ becomes negative and the four-bar linkage is said to go "over center" as shown in FIG. 8; the sum of A plus D must exceed the sum of B plus C for said four-bar mechanism to go over center. The magnitude of negative angle $\alpha$ varies with the amount of excess of the sum of A plus D over the sum of B plus C; this excess is normally designed to be less than about 5% of the sum of B plus C. This over center motion of the handrail assembly is associated with a change in sign, from counterclockwise to clockwise, of the moment $M_H$. The moment $M_H$ will therefore act to aid in raising the platform when the angle $\alpha$ becomes negative. This is shown in FIG. 8 by the perpendicular force $P_P$ which, together with the eccentric angle $\Delta$, raises the drop platform without further manual assistance. The unbalanced moment Mu of the drop platform is equal to the sum of the moments; $M_H$ of the handrail assembly; $M_P$ due to the weight of the drop platform; and $M_W$ due to the weight of the counterbalance. The unbalanced moment Mu is adjusted at values of $\theta$ equal to zero degrees and approaching ninety degrees, i.e. above about eighty degrees. The value of $\theta$ equal to zero degrees is determined by the desired hold down moment and is achieved by varying the counterbalance weight $W_W$, e.g. adding or subtracting ballast, when the platform is in the horizontal position. The unbalanced moment Mu, as $\theta$ approaches ninety degrees, which restrains the platform in the raised position is determined by presetting of the eccentric angle $\Delta$ at the time of manufacture and can be adjusted to some extent in the field by varying the dimension A during installation; in any event it should not be so large as to impede manual lowering of the drop platform. When the unbalanced moment $M_U$ is properly adjusted, two actions of the platform are achieved: (a) while in the lowered position the platform will remain down without additional weights and thus a workman cannot be stranded on a vessel or vehicle without means of egress; and (b) while in the raised position the platform will tend to remain up without additional restraint and will not fall into the path of an on-coming vehicle. The second-mentioned action is due to the overcenter action of the drop platform and/or the eccentric angle $\Delta$.

Figure 9:
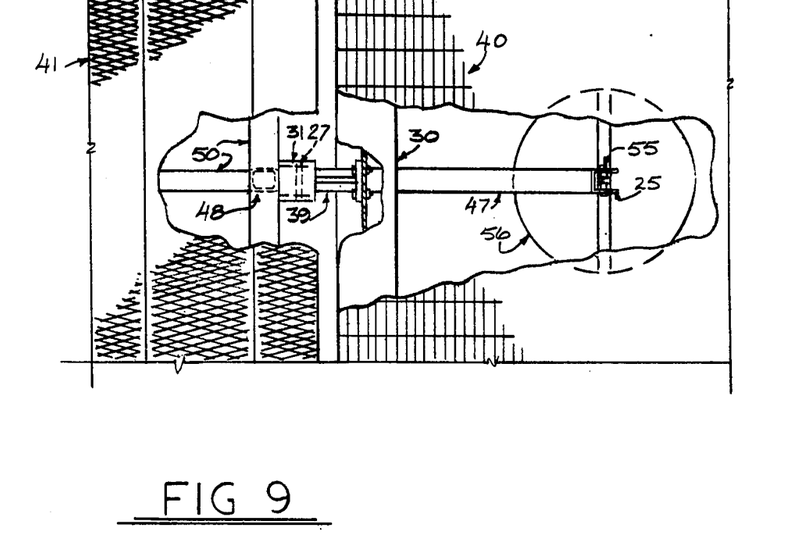
FIGS. 9 and 10 are, respectively, top plan and side elevational views of a modified form of gravity counterweight system for said drop platform.
Figure 10:
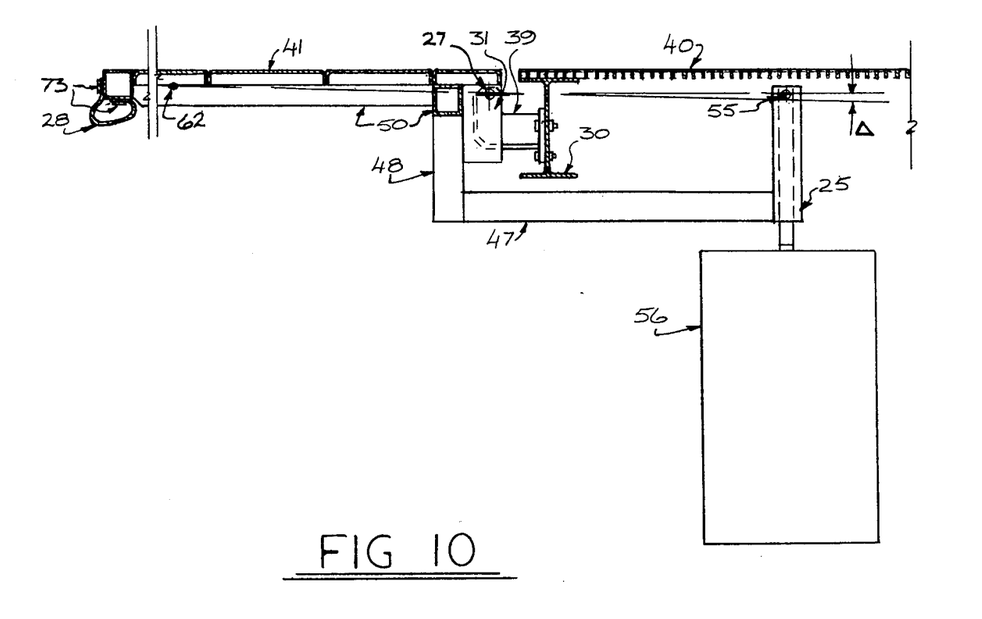

Referring now to FIGS. 9 and 10, a modification to the drop platform is illustrated therein. In the description of the first modification, the counterbalance weight assembly 54, 55, 56 was illustrated as being located outside of the fixed platform structure 30, 40, 53. This modification shown in FIGS. 9 and 10 suspends the counter-balance weight underneath (underslung) the fixed platform deck 40. This modification includes structural members 48, 47, and 25 all welded together and to rear drop platform member 50 and hinge 31; said modification eliminates the counterweight common connecting member 29 in the first modification. Member 25 is channel shaped and open at the rear thereof to accommodate hinge 55 and permit swinging of the counterbalance 56 thereabout during movement of the drop platform. The length of members 48 and 25 are such that clearances are always maintained below the fixed platform 40 and beam 30. In this modification the counterbalance weights 56 and the hinges 27, 31, 39 are shown widthwise aligned with each other but the counterbalances 56 can be disposed outboard of said hinges 27, 31, 39 as in the prior modification. The operation of the counterbalance weights 56 and the hinges 27, 31, 39 and the platform center of gravity are the same as for the first modification; also, the unbalanced moment is the same.

Figure 11:
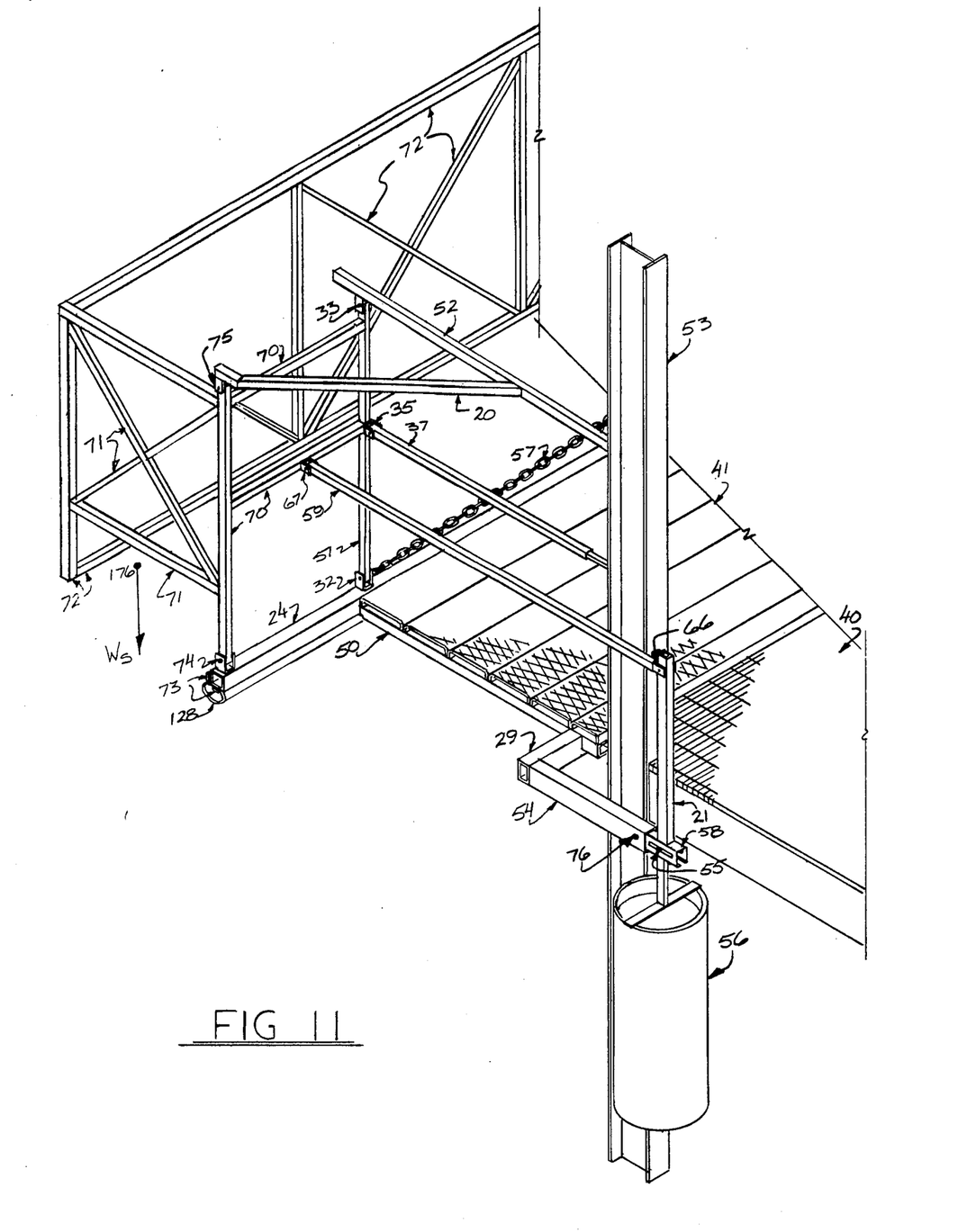
FIG. 11 is a fragmentary perspective view of a modified form of said platform equipped with a safety cage.

Referring now to the FIG. 11, a further modification to the drop platform is shown therein. This modification is the attachment of a deckless structural safety cage to the drop platform and the incorporation of a second four-bar mechanism in the counterbalance assembly. Said safety cage can be termed a structural safety cage because each wall section thereof is a fully braced rigid truss. Said second four-bar mechanism consists of a pair of structures on each side of the drop platform. Each structure consists of connecting members 29 and 54 (including adjustable hinge retainer 58 and pin 76), lever arm 21 (including hinge 66), a rear portion of connecting member 59 and column 53. The safety cage assembly is made of rear and side trusses 70, 71, respectively, and front truss 72 all rigidly joined together, the front of the platform main frame 50 is joined to a widthwise extending beam 24 which is wider than the drop platform and has a rubber bumper 128 made fast to the bottom thereof. The rear trusses 70 of the safety cage are hinged to the beam 24 via hinges 74 and 32 and to the handrail assembly via hinges 33, 35 and 75; stiffening braces 20 join the upper corners of the rear trusses 70 to the top rails 52. Said rear trusses are also hinged to the connecting members 59 via hinges 67. Hinge pin 55 which pivotally supports the counterweight 56 is adjustably made fast to hinge retainer 58 and its position lengthwise of said hinge retainer 58 is thus adjustable in the field by means of the slot shown in said hinge retainer 58. The latter is made fast to lever arm 21 as shown and pivotally connected to member 54 about the hinge pin 76; for this purpose the member 54 has its bottom wall removed in the area of said pin 76 (not shown) so that hinger pin 55 can pivot upwardly and downwardly below said pin 76. Said four-bar mechanism augments the moment of the counterbalance assembly to compensate for the weight of the safety cage. The safety cage assembly acts as an extension to the handrails and fixed deck and surrounds the workspace with a rigid structural truss capable of protecting workmen against falls and of supporting the drop way, e.g. when the safety cage without the platform rests on the vehicle being loaded. The posts of said safety cage remain vertical with handrail posts 52 during the pivotal movement of said safety cage about hinges 32, 33, 66, 67, 74 and 75. Said post 51 remains essentially vertical, i.e. within five degrees of vertical, through the range of elevation of the drop platform for vehicle or vessel loading or unloading. Safety cage 70, 71, 72 is hinged to the front edge of the drop platform by the use of said post 51 so that the front truss 72 also remains essentially vertical. This is an advantage since the bottom edge of said front truss 72 is always disposed at substantially the same elevation as that of the front edge of the drop platform so that in its lowered position it will meet the loading vessel or vehicle at about the same time and not leave any unacceptable gap. The safety cage motion duplicates that of the handrail post 51 and can therefore be predetermined by design selection of the dimensions A, B, C and D to maintain the safety cage substantially level at all times. Minor adjustments to dimension A can be made in the field at retention clamp 60 and hinge 34. The gravitational moment of the saftey cage $M_S$ about the hinge 31 is proportional to the weight of the safety cage $W_S$ acting at the center of gravity 176 (FIG. 11); and to the horizontal distance G from point 176 to hinge 74. The unbalanced moment of the drop platform with the safety cage assembly $M_U'$ is equal to the sum of the unbalanced moment $M_U$ of the dropway and the moment $M_S$ of the safety cage assembly. It can be mathematically demonstrated that the moment $M_S$ of the safety cage is the dominant effect in determining the unbalanced moment $M_U'$ when $\theta$ approaches ninety degrees. The moment $M_S$ acts in a counterclockwise direction and is compensated for by the addition of said second four-bar mechanism which directly links the safety cage assembly 70, 71, 72 to the counterweight 56 and augments the moment of the counterweight $M_C$ proportionally to the moment of the safety cage $M_S$. The hinge pin 55 is lengthwise adjustable of hinge retainer 58 to provide for field adjustments in the counterweight to alter its moment $M_C$ and compensate for future changes to the safety cage which may change the weight $W_S$ of the safety cage and the distance G. The addition of a safety cage as described provides for the workman a protective barrier around the workspace on top of the vessel or vehicle consisting of a handrail, bottom rail and intermediate members in order to prevent a fall from the workspace. Since this safety cage assembly remains essentially parallel to the ground and to the top of the vehicle or vessel, the clearance between the bottom rail and the vessel or vehicle can be maintained suitably small (i.e. not more than about six inches) regardless of the height of the vessel or vehicle.

Figure 12:
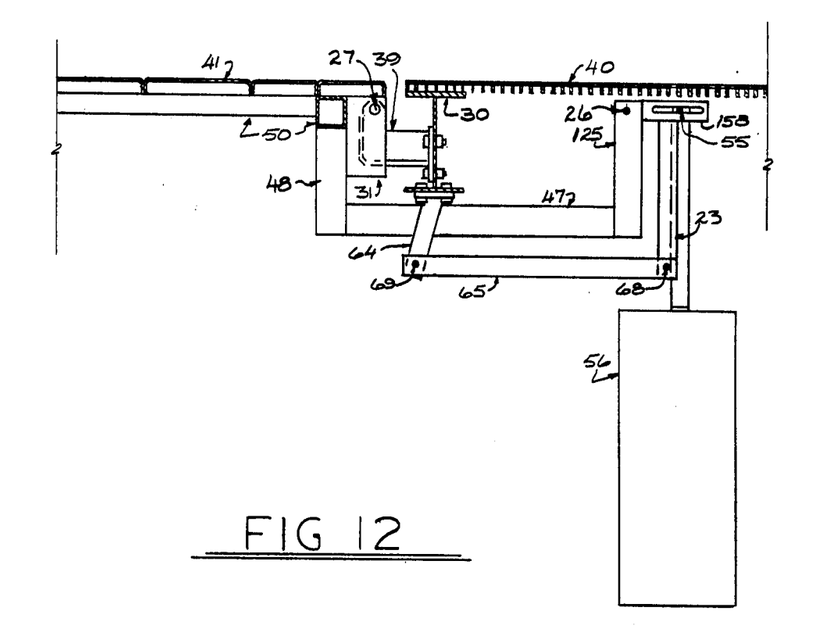
FIGS. 12–14 are, respectively, fragmentary side elevational views of a modified form of gravity counterweight system for said drop platform.

Referring now to FIG. 12 another modification to the drop platform is shown therein. This modification is the addition of a different compensating four-bar mechanism to a platform which has a safety cage and underslung counterbalance weights. The safety cage assembly is the same as that for the previous modification. This compensating mechanism consists of a pair acting beneath the drop platform. Each pair consists of main frame beam 30 (including hinge element 39 and rigid positioning arm 64); linkage arm 65 (including pins 68 and 69), lever arm 23 (including adjustable hinge retainer 158) and the moveable assembly comprising members 125, 47, 48 (including main frame 50, hinge pins 26 and 27 and hinge elememt 31). This compensating mechanism acts on the counter balance assembly and the relative positions of the hinge points 27, 69, 68, 26 thereof are made proportional to the hinge points 27, 32, 33, 34 of said first-mentioned four-bar linkage so that they are mechanically equivalent. Hinge pin 55 for the counter weight is adjustably made fast to the hinge retainer 158 as previously described. The latter is made fast to the lever arm 23 as shown and is pivotably connected to the member 25 about the hinge pin 26; for this purpose the member 25 has walls removed (not shown) in the area of the pin 26 so that hinge pin 55 can pivot upwardly and downwardly below said pin 26. Thus this last-mentioned four-bar mechanism will augment the moment of the counterbalance assembly to compensate for the weight of the safety cage assembly similarly as described for FIG. 11.

Figure 13:
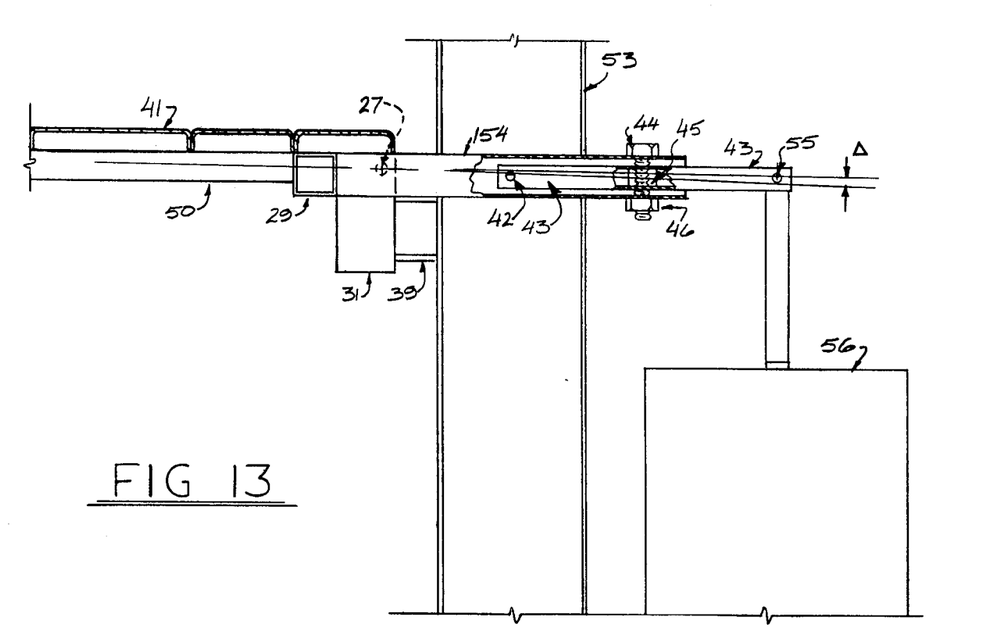

Referring now to FIG. 13 another modification to the counterbalance support arms is illustrated therein. This modification consists of providing a hollow member 154 and installation of member 43 therein; said member 43 contains hinge 55 on the outer end thereof. The inner end of member 43 is hinged inside member 154 at hinge 42. Vertical travel of member 43 is controlled by bolt 44 acting on threaded bushing 45 which is welded to member 43. Nut 46 locks bolt 44 after adjustment has been made. The total vertical travel of member 43 is limited by the internal clearance between members 43 and 154. Member 43 is restrained against rotational and translational motion. The position of member 43 relative to member 154 adjusts the magnitude of the eccentric angle $\Delta$. It can be mathematically demonstrated that small changes to the eccentric angle $\Delta$ will have a considerable effect on the hold up force of the drop platform which means that the hold up force can be adjusted substantially independently of the hold down force. This is a decided advantage in that both the hold up and the hold down forces can be varied in the field to suit the particular application and to accommodate any changes made in the system after installation. The platform is balanced by the counterbalance weight at the time of installation with the platform being level to the ground and with member 43 also level. The angle $\Delta$ is varied by turning bolt 44 and changing the angle of member 43 relative to member 154 to set the unbalanced moment for the platform in the raised position. Small changes to the eccentric angle (plus or minus two degrees) will cause little change (i.e. less than about 1%) in the unbalanced moment acting on the platform in the horizontal (lowered) position. This is an advantage insofar as the hold up force can be adjusted independently of the hold down force; the latter is adjusted by varying the counterweight 56. The same modification of FIG. 3 shown in FIG. 13 can be applied to the modification shown in FIG. 11, i.e. member 54 can be replaced by member 154 and associated mechanism 42–46 for adjusting the eccentric angle $\Delta$ in the field.

Figure 14:
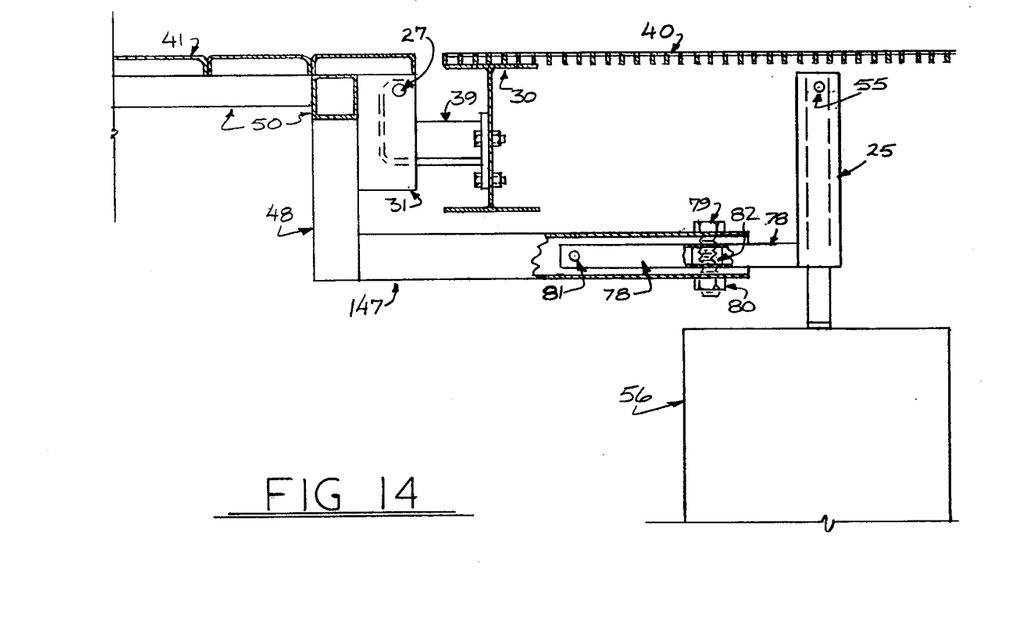

Referring now to FIG. 14 another modification to the counterbalance support arm is illustrated therein. The modification consists of providing a hollow member 147 and installation of member 78 therein; said member 78 supports member 25 at the outer end thereof. The inner end of member 78 is hinged inside member 147 at hinge 81. Vertical travel of member 78 is controlled by bolt 79 acting on threaded bushing 82 which is welded to member 78. Nut 80 locks bolt 79 after adjustment has been made. The total vertical travel of member 78 is limited by internal clearance between members 78 and 147. Member 78 is restrained against rotational and translation motion. The operation is similar in all respects to that of the modification shown in FIG. 13. The same modification of FIG. 10 shown in FIG. 14 can be applied to the modification shown in FIG. 12, i.e. member 47 can be replaced by member 147 and associated mechanism 78–82 for adjusting the eccentric angle $\Delta$ in the field.

It will thus be seen that there has been provided by my invention improvements in drop ways for bulk loading facilities in which the object hereinabove set forth, together with many throughly practical advantages, has been successfully achieved. For example, the handrail assembly is designed as a four bar mechanism which creates an unbalanced net gravity moment about hinge pin 27 which changes from a counterclockwise sense to a clockwise sense as the platform is raised through a predetermined angle $\beta$. As the platform is raised toward 90 degrees the other gravity moments decrease with the cosine of the angle of inclination but the unbalanced moment of the handrail assembly tends to increase in the clockwise direction. This action restrains the platform in the raised position without the need for additional restraints in a manner that is both controlled and easily overcome by a workman and yet sufficiently vigorous to hold the platform against moderate winds if desired. An important advantage is in the one step raising and restraining operation-- the workman need not take extra, often forgotten, steps to latch the platform in the raised position in the course of his normal daily routine. The safety cage, which acts as a handrail around the work area, is attached directly to and as an integral working part of the drop platform assembly. Said safety cage completely surrounds the work area providing both top and bottom rails and intermediate bracing and is required to prevent falls and related injury to the workman. Since the safety cage is capable of providing full support to the workmen in all positions, additional support from the vehicle being loaded is not required. However, should the safety cage bear on the vehicle due to unforseen interferences on the vehicle such as ladders, nozzles, etc. or due to misalignment of the vehicle, the safety cage is capable of providing full support to the drop platform without loss or sacrifice of its utility as a safety barrier. Since the work area is completely surrounded, the use of a safety harness is not required. Since the safety cage acts as an integral part of the drop platform, and in addition, since the top and bottom of the safety cage remain essentially parallel to the ground throughout the normal working range of the platform, the safety cage is always in the proper and most effective position whenever the platform is in use. There is no chance for human error to negate the usefulness of the safety cage. The mechanism incorporated into the counterbalance assembly, as described, causes the counterbalance weight to duplicate the locus of the gravity moment of the platform and safety cage assembly. The use of said second four bar mechanism as a compensating mechanism on the counterbalance assembly duplicates in reverse the action of the center of gravity of the safety cage and results in an even controlled ascent and descent of the platform and considerably reduces the effort on the part of the workman. This permits the construction of longer and wider platforms for manual operation. The mechanism which permits on site continuous adjustment of the angle $\Delta$ with hand tools provides selection of the desired restraining force in the field and automatically compensates for variances in assembled platform weights, hinge point location and true center of gravity. When said means for adjusting angle $\Delta$ is used in conjunction with the means for adjusting length A, substantially total adjustment of the unbalanced drop platform gravity moment is possible. This mechanism for adjusting angle $\Delta$ can be used with underslung and outboard counterbalance weights and with or without a safety cage attached to the platform. The means for adjusting length A exercises control in the action of the four bar mechanism of the handrail in that increasing length A decreases the angle $\beta$ at which the gravity moment of the handrail changes direction; decreasing length A has the opposite effect, i.e. decreases negative angle $\alpha$. Should the platform be operated while the handrail is held, the workman's fingers cannot be pinched in view of the upper front hinge being offset below the handrail as shown and described.

While preferred embodiments of my invention have been shown and described, it is to be understood that variations and changes may be resorted to without departing from the spirit of my invention as defined by the appended claims.

What I claim is:

1. Improvement in a bulk loading facility having a fixed deck having a vertical column as a part thereof and a drop way hinged to said deck so that it can be raised or lowered for loading, said improvement comprising said drop way having a handrail assembly including a handrail and a post for said handrail, said handrail and said post hinged to each other, said post hinged to said drop way, said drop way, said handrail hinged to said column, and a four-bar mechanism consisting of said drop way, said handrail, said post and a portion of the column between the handrail and said drop way, said four-bar mechanism constructed so that the sum of the lengths of said column portion and said top rail is greater than the sum of the lengths of said drop way and said post, whereby said drop way has an over-center action during raising thereof which assists in maintaining the drop way in its raised position.

2. Improvement as claimed in claim 1, a releasable clamp mechanism for the hinge between said column and handrail so that field adjustments can be made to the length of the column portion of said four-bar mechanism.

3. Improvement in a bulk loading facility having a fixed deck having a vertical column as a part thereof and a drop way hinged to said deck so that it can be raised or lowered for loading said improvement comprising said drop way having a handrail assembly including a handrail and a post for said handrail, said handrail and said post hinged to each other, said post hinged to said drop way, said handrail hinged to said column, and a gravity counterweight system for balancing said drop way having a counterweight disposed on the fixed deck side of the hinge axis for said drop way, said counterweight pivotally connected to a moment arm, said moment arm connected to the dropway, the pivot point for said counterweight effectively acting above a line passing through both the pivot pin for the drop way and the center of gravity thereof, whereby to impart an eccentricity to said counterweight system which augments the hold up force exerted on said dropway.

4. Improvement as claimed in claim 3, a widthwise extending beam joined to the underside of said drop way at the rear thereof, said beam extending outboard of said drop way and of said fixed deck, said counterweight pivotally connected to the outboard end of said beam so as to be disposed outboard of said drop way and of said fixed deck.

5. Improvement as claimed in claim 3, a beam assembly joined to said drop way and extending lengthwise thereof, said beam assembly being generally U-shaped so as to extend downwardly, rearwardly, and upwardly of the hinge axis for said drop way, said counterweight pivotally connected to the rear end of said beam assembly so that said counterweight is disposed inboard of and underslung in respect to said drop way.

6. Improvement as claimed in claim 3 a gravity means for making field adjustments of the eccentricity of said counterweight system.

7. Improvement as claimed in claim 6, said means for adjusting the eccentricity of said counterweight system comprising a connecting member joined to the drop way, another connecting member joined to the counterweight, pivot means joining the two connecting members together and providing a pivot axis therefor, fastening means for the two connecting members spaced from said pivot axis including means for locking the two connecting members in any of their pivotally adjusted positions.

8. Improvement in a bulk loading facility having a fixed deck having a vertical column as a part thereof and a drop way hinged to said deck so that it can be raised or lowered for loading, said improvement comprising a deckless structural safety cage assembly hinged to said drop way for enclosing a workspace in front and to the sides of the front edge of the drop way, the hinge axis for said drop way also serving commonly as the hinge axis for said safety cage, each wall section of said safety cage assembly being a braced rigid truss, said safety cage having posts which remain substantially vertical throughout the travel of said drop way in its raising and lowering action, whereby said safety cage is capable of protecting workmen against falls and of supporting the drop way.

9. Improvement as claimed in claim 8, a gravity counterbalance system for balancing said drop way and safety cage having a counterweight disposed on the fixed deck side of the hinge axis for said drop way, said counterweight pivotally connected to a moment arm, said moment arm connected to the drop way, the pivot point for said counterweight effectively acting above a line passing through both the pivot pin for the drop way and the center of gravity thereof, whereby to impart an eccentricity to said counterweight system which augments the hold up force exerted on said drop way and safety cage assembly.

10. Improvement as claimed in claim 9, said second four-bar mechanism including a hinge retainer for the counterweight hinge which permits translational adjustments of said counterweight hinge toward or away from the hinge axis for said drop way, whereby to adjust the counterweight movement arm for any given counterbalance weight.

11. Improvement as claimed in claim 10, said second four-bar mechanism including two connecting members hinged to each other, one of said connecting members hinged directly to said safety cage, and the other made fast to said hinge retainer.

12. Improvement as claimed in claim 10, said second four-bar mechanism including two connecting members hinged to each other, one of said connecting members hinged to said fixed deck adjacent the hinge axis of said drop way, and the other made fast to said hinge retainer.

13. Improvement as claimed in claim 9, a second four-bar mechanism which augments the moment of the gravity counterweight system to compensate for the added weight of said safety cage.

14. Improvement in method of constructing a bulk loading facility having a fixed deck having a vertical column as a part thereof and a drop way hinged to said deck so that it can be raised or lowered for loading, said improvement comprising providing a handrail assembly for said drop way including a handrail and a post for said handrail, hinging said handrail and said post to each other, hinging said post to said drop way, hinging said handrail to said column, and providing a four-bar mechanism consisting of said drop way, said handrail, said post and a portion of the column between the handrail and said drop way, arranging said four-bar mechanism so that the sum of the lengths of said column portion and said top rail is greater than the sum of the lengths of said drop way and said post, whereby said drop way has an over-center action during raising thereof which assists in maintaining the drop way in its raised position.

15. Improvement in method of constructing a bulk loading facility having a fixed deck having a vertical column as a part thereof and a drop way hinged to said deck so that it can be raised or lowered for loading, said improvement comprising providing a handrail assembly for said drop way including a handrail and a post for said handrail, hinging said handrail and said post to each other, hinging said post to said drop way, hinging said handrail to said column, balancing said drop way with a gravity counterweight system having a counterweight disposed on the fixed deck side of the hinge axis for said drop way, pivotally connecting said counterweight to a moment arm, connecting said moment arm to the drop way, the pivot point for said counterweight effectively acting above a line passing through both the pivot pin for the drop way and the center of gravity thereof, whereby to impart an eccentricity to said counterweight system which augments the hold up force exerted on said drop way.

16. Improvement as claimed in claim 15, joining a widthwise extending beam to the underside of said drop way at the rear thereof, said beam extending outboard of said drop way and of said fixed deck, pivotally connecting said counterweight to the outboard end of said beam so that it is disposed outboard of said drop way and of said fixed deck.

17. Improvement as claimed in claim 15, joining a beam assembly to said drop way so that it extends lengthwise thereof, extending said beam assembly downwardly, rearwardly, and upwardly of the hinge axis for said drop way, pivotally connecting said counterweight to the rear of said beam assembly so that said counterweight is disposed inboard of and underslung in respect to said drop way.

18. Improvement as claimed in claim 16, providing for making field adjustments of the eccentricity of said counterweight system.

19. Improvement as claimed in claim 18, said adjusting of the eccentricity of said counterweight system comprising joining a connecting member to the drop way, joining another connecting member to the counterweight, pivotally joining the two connecting members together and providing a pivot axis therefor, fastening the two connecting members together at a point spaced from said pivot axis so that the two connecting members can be locked in any of their pivotally adjusted positions.

20. Improvement as claimed in claim 14, providing for vertical adjustment of the hinge between said column and handrail so that field adjustments can be made to the length of the column portion of said four-bar mechanism.

21. Improvement in method of constructing a bulk loading facility having a fixed deck having a vertical column as a part thereof and a drop way hinged to said deck so that it can be raised or lowered for loading, said improvement comprising hinging a safety cage assembly to the front edge of said drop way for enclosing a workspace in front and to the sides of the front edge of said drop way, the hinge axis for said drop way also serving commonly as the hinge axis for said safety cage, forming each wall section of said safety cage assembly so that it is a rigid braced truss, said safety cage assembly having posts which remain substantially vertical throughout the travel of said drop way in its raising and lowering action.

22. Improvement as claimed in claim 21, balancing said drop way and safety cage assembly with a gravity counterweight system having a counterweight disposed on the fixed deck side of the hinge axis for said drop way, said counterweight pivotally connected to a moment arm, connecting said moment arm to the drop way, the pivot point for said counterweight effectively acting above a line passing through both the pivot pin for the drop way and the center of gravity thereof, whereby to impart an eccentricity to said counterweight system which augments the hold up force exerted on said drop way and safety cage assembly.

23. Improvements as claimed in claim 22, said second four-bar mechanism having a hinge retainer for the counterweight hinge which permits translational adjustments of said counterweight hinge toward or away from the hinge axis for said drop way, whereby to adjust the counterweight moment arm for any given counterbalance weight.

24. Improvement as claimed in claim 23, said second four-bar mechanism including two connecting members, hinging said connecting members to each other, hinging one of said connecting members directly to said safety cage and making the other fast to said hinge retainer.

25. Improvement as claimed in claim 23, said second four-bar mechanism including two connecting members, hinging one of said connecting members to said fixed deck adjacent the hinge axis of said drop way and making the other fast to said hinge retainer.

26. Improvement as claimed in claim 22, providing a second four-bar mechanism and augmenting therewith the moment of the gravity counterweight system to compensate for the added weight of said safety cage.

* * * * *